US011099301B2

(12) United States Patent
Lim

(10) Patent No.: US 11,099,301 B2
(45) Date of Patent: Aug. 24, 2021

(54) DISPLAY DEVICE COMPRISING NANO-PATTERN LAYER

(71) Applicant: Samsung Display Co., Ltd., Yongin-si (KR)

(72) Inventor: Ho Lim, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 279 days.

(21) Appl. No.: 16/203,543

(22) Filed: Nov. 28, 2018

(65) Prior Publication Data

US 2019/0265390 A1   Aug. 29, 2019

(30) Foreign Application Priority Data

Feb. 27, 2018   (KR) .................. 10-2018-0023670

(51) Int. Cl.
| | | |
|---|---|---|
| *G02B 27/00* | (2006.01) | |
| *G02B 1/111* | (2015.01) | |
| *G02F 1/13357* | (2006.01) | |
| *G02F 1/1335* | (2006.01) | |

(Continued)

(52) U.S. Cl.
CPC .............. *G02B 1/111* (2013.01); *G02B 1/118* (2013.01); *G02F 1/133502* (2013.01); *G02F 1/133617* (2013.01); *G02F 1/1368* (2013.01); *G02F 1/133512* (2013.01); *G02F 2202/36* (2013.01)

(58) Field of Classification Search
CPC ........... G02B 1/111; G02B 1/118; G02B 1/00; G02B 1/10; G02B 1/11; G02B 1/113; G02B 1/115; G02F 1/133502; G02F 1/133617; G02F 1/133512; G02F 1/1368; G02F 2202/36; B32B 2307/40

USPC ........ 359/601, 609.577, 580, 582, 586, 588, 359/589, 590

See application file for complete search history.

(56) References Cited

U.S. PATENT DOCUMENTS

| | | | | |
|---|---|---|---|---|
| 8,547,639 B2 * | 10/2013 | Watanabe | ............ | G02B 5/0278 359/599 |
| 2006/0269660 A1 * | 11/2006 | Nishikawa | ............. | G02B 1/105 427/162 |

(Continued)

FOREIGN PATENT DOCUMENTS

| | | |
|---|---|---|
| JP | 2007-226178 A | 9/2007 |
| KR | 10-2014-0087465 A | 7/2014 |
| KR | 10-2015-0095558 A | 8/2015 |

(Continued)

OTHER PUBLICATIONS

Li, Xiao et al., "Porous Polymer Films with Gradient-Refractive-Index Structure for Broadband and Omnidirectional Antireflection Coatings", Advanced Functional Materials, 2010, 20, pp. 259-265.

(Continued)

*Primary Examiner* — Arnel C Lavarias
(74) *Attorney, Agent, or Firm* — Lewis Roca Rothgerber Christie LLP

(57) ABSTRACT

An exemplary embodiment provides a display device including: a display panel; and an anti-reflective layer configured to overlap the display panel, wherein the anti-reflective layer includes: a nano-pattern layer configured to include a plurality of nanostructures; and a low-refraction layer configured to cover the nanostructures, wherein the nanostructures are irregularly disposed.

18 Claims, 14 Drawing Sheets

(51) Int. Cl.
    *G02B 1/118*     (2015.01)
    *G02F 1/1368*     (2006.01)

(56) References Cited

U.S. PATENT DOCUMENTS

2015/0273792 A1* 10/2015 Tazawa .................... B32B 7/12
    428/142
2020/0132900 A1* 4/2020 Furuta .................... B82Y 40/00

FOREIGN PATENT DOCUMENTS

| | | |
|---|---|---|
| KR | 10-2017-0109134 A | 9/2017 |
| WO | WO 2013/152256 A1 | 10/2013 |

OTHER PUBLICATIONS

Mehta, Dalip Singh et al., "Light out-coupling strategies in organic light emitting devices", Proc. of ASID'06, Oct. 8-12, 2006, pp. 198-201.

Walheim, Stefan et al., Nanophase-separated polymer films as high-performance antireflection coatings, Science Mag., vol. 283, Jan. 22, 1999, pp. 520-522.

Xi, J.-Q. et al., Optical thin-film materials with low refractive index for broadband elimination of Fresnel reflection, Letters, Nature Photonics, vol. 1, Mar. 2007, pp. 176-179.

* cited by examiner

DISPLAY DEVICE COMPRISING NANO-PATTERN LAYER

CROSS-REFERENCE TO RELATED APPLICATION

This application claims priority to and the benefit of Korean Patent Application No. 10-2018-0023670 filed in the Korean Intellectual Property Office on Feb. 27, 2018, the entire contents of which are incorporated herein by reference.

BACKGROUND

1. Field

The present disclosure relates to a display device.

2. Description of the Related Art

A liquid crystal display may include two field generating electrodes, a liquid crystal layer, a color filter, and a polarization layer. Light emitted from a light source reaches a viewer through the liquid crystal layer, the color filter, and the polarization layer. At this time, light loss may occur in the polarizing layer, the color filter, or the like. The light loss may occur in a display device such as an organic light emitting diode display as well as a liquid crystal display.

A display device including a color conversion display panel using semiconductor nanocrystals has been proposed in order to provide a display device having high color reproducibility and reduced light loss.

The above information disclosed in this Background section is only for enhancement of understanding of the background of the present disclosure and therefore it may contain information that does not form the prior art that is already known in this country to a person of ordinary skill in the art.

SUMMARY

Exemplary embodiments have been made in an effort to provide a display device capable of improving light-emitting efficiency and display quality.

An exemplary embodiment of the present disclosure provides a display device including: a display panel; and an anti-reflective layer configured to overlap the display panel, wherein the anti-reflective layer includes: a nano-pattern layer configured to include a plurality of nanostructures; and a low-refraction layer configured to cover the nanostructures, wherein the nanostructures are irregularly disposed.

The diameter of each of the nanostructures may be in a range of 300 nm to 800 nm.

A height of the nanostructures relative to each diameter thereof may be in a range of 0.4 to 0.6.

A refractive index of the nano-pattern layer may be in a range of 1.4 to 1.7, and a refractive index of the low-refraction layer may be in a range of 1.2 to 1.4.

A refractive index of the anti-reflective layer gradually may increase toward the display panel.

The low-refraction layer may include a porous material or a polymer material including a fluorine-substituted hydrocarbon.

The nano-pattern layer may include at least one of polymethyl methacrylate (PMMA), polycarbonate (PC), polyurethane (PU), acrylate monomers or oligomers having two or more functional groups and nine or less functional groups, an organosilane containing an acrylate group or an epoxy group as a reactor, a phosphazene compound containing an acrylate group or a vinyl group as a reactor, and an adamantane compound containing an acrylate group or a vinyl group as a reactor. Each of the nano structures may be at least one of a nano-fiber type (or kind) and a nano-particle type (or kind).

Light emitted from the display panel has a Lambertian emission pattern.

The display panel may include: a color conversion layer configured to include a semiconductor nanocrystal; and a transmissive layer.

An exemplary embodiment of the present disclosure provides a display device including: a display panel; and an anti-reflective layer configured to overlap the display panel, wherein the anti-reflective layer includes: a nano-pattern layer positioned on the display panel to include a plurality of nanostructures; and a low-refraction layer configured to cover the nanostructures, wherein a refractive index of the nano-pattern layer is greater than a refractive index of the low-refraction layer, and a refractive index of the anti-reflective layer increases toward the display panel.

According to the exemplary embodiments, it is possible to provide a display device capable of having improved light-emitting efficiency and display quality.

BRIEF DESCRIPTION OF THE DRAWINGS

The accompanying drawings, together with the specification, illustrate embodiments of the subject matter of the present disclosure, and, together with the description, serve to explain principles of embodiments of the subject matter of the present disclosure.

DETAILED DESCRIPTION

Figure 1:
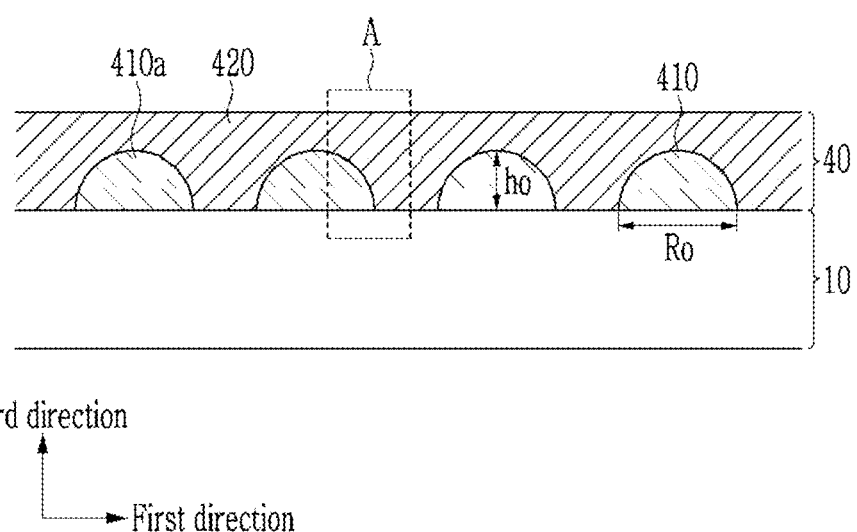
FIG. 1 is a schematic cross-sectional view illustrating a display device according to an exemplary embodiment.

The subject matter of the present disclosure will be described more fully hereinafter with reference to the accompanying drawings, in which exemplary embodiments of the present disclosure are shown. As those skilled in the art would realize, the described embodiments may be modified in various different ways, all without departing from the spirit or scope of the present disclosure.

To clearly describe the subject matter of the present disclosure, parts that are irrelevant to the description are omitted, and like numerals refer to like or similar constituent elements throughout the specification.

Further, since sizes and thicknesses of constituent members shown in the accompanying drawings may be arbitrarily given for better understanding and ease of description, the present disclosure is not limited to the illustrated sizes and thicknesses. In the drawings, the thickness of layers, films, panels, regions, etc., may be exaggerated for clarity. In the drawings, for better understanding and ease of description, the thicknesses of some layers and areas may be exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, the word "over" or "on" means positioning on or below the object portion, and does not necessarily mean positioning on the upper side of the object portion based on a gravity direction.

In addition, unless explicitly described to the contrary, the word "comprise" and variations such as "comprises" or "comprising" will be understood to imply the inclusion of stated elements but not the exclusion of any other elements.

Further, in the specification, the phrase "in a plan view" means when an object portion is viewed from above, and the phrase "in a cross-section" means when a cross-section taken by vertically cutting an object portion is viewed from the side.

Figure 2:
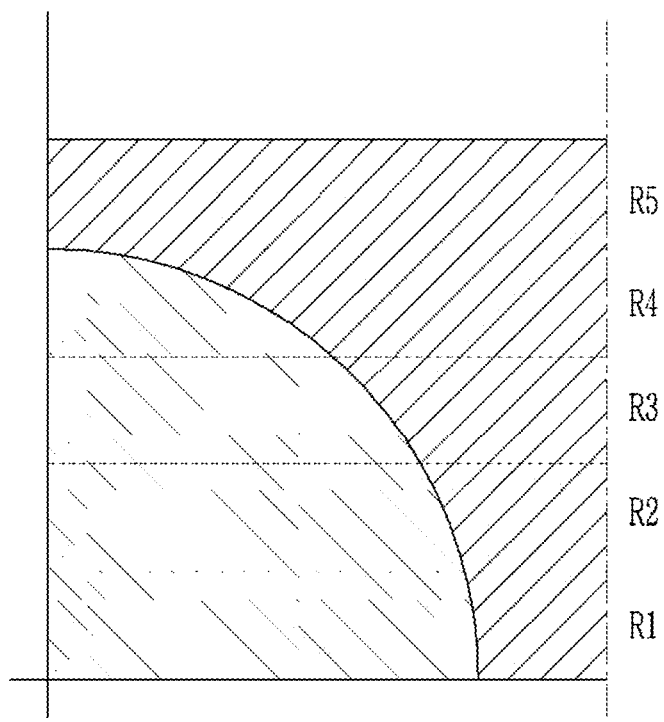
FIG. 2 is an enlarged view illustrating a part A of an anti-reflective layer of FIG. 1.
Figure 3:
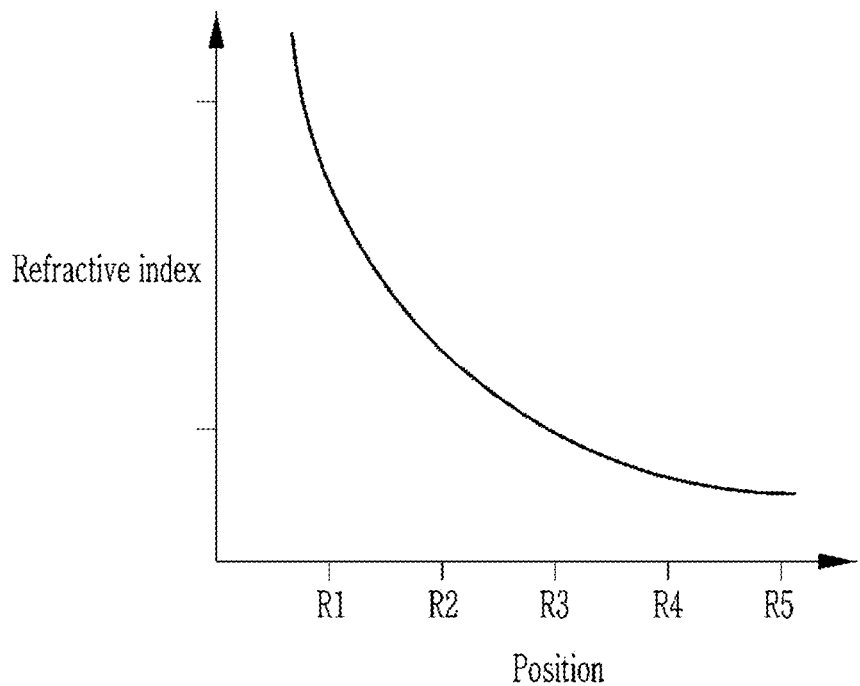
FIG. 3 is a graph showing a refractive index of each region of FIG. 2.

A display device according to an exemplary embodiment will now be described with reference to FIG. 1 to FIG. 3. FIG. 1 is a schematic cross-sectional view illustrating a display device according to an exemplary embodiment, FIG. 2 is an enlarged view illustrating a part A of an anti-reflective layer of FIG. 1, and FIG. 3 is a graph showing a refractive index of each region of FIG. 2.

Referring to FIG. 1, the display device according to the present exemplary embodiment includes a display panel 10 and an anti-reflective layer 40 positioned on the display panel 10. The present specification illustrates a structure in which the display panel 10 and the anti-reflective layer 40 directly contact each other, but it is not limited thereto. For example, an additional adhesive layer, a touch panel, or a window may be positioned between the display panel 10 and the anti-reflective layer 40.

The display panel 10 according to the present exemplary embodiment may include a display crystal panel which generates a vertical electric field, a liquid crystal panel which generates a horizontal electric field, a plasma display panel (PDP), a light emitting diode display (LED), a surface conduction electron-emitter display (SED), a field emission display (FED), a vacuum fluorescent display (VFD), an E-paper, or the like. The display panel according to the exemplary embodiment will be described in more detail herein below.

The anti-reflective layer 40 is positioned on the display panel 10. The anti-reflective layer 40 includes a nano-pattern layer 410 positioned on the display panel 10 and a low-refraction layer 420 positioned on the nano-pattern layer 410.

The anti-reflective layer 40 serves to prevent or reduce reduction of light-emitting efficiency by suppressing or reducing light externally emitted from the display panel 10 from being totally reflected due to a refractive index difference between the display panel 10 and the air.

The anti-reflective layer 40 may have a refractive index between that of the display panel 10 and the air. The may be increased toward the display panel 10. For example, the refractive index of the anti-reflective layer 40 may be gradually increased toward the display panel 10.

The nano-pattern layer 410 may include a plurality of nanostructures 410a positioned on the display panel 10. The nanostructures 410a may have a hemispherical or similar to a hemispherical shape. In the present specification, the shape that is similar to hemispherical indicates a hemispherical shape having a portion that is depressed or protruded.

Each diameter $R_0$ of the nanostructures 410a may be in a range of about 300 nm to 800 nm. For example, it may be about 450 nm. When the diameter of the nanostructure 410a exceeds about 800 nm, a certain pattern may be visible, or an effect of preventing total reflection may be insignificant.

An aspect ratio of the nanostructure 410 may be in a range of about 0.4 to 0.6. For example, a ratio of a height $h_0$ of the nanostructure 410a relative to a diameter $R_0$ may be in a range of about 0.4 to 0.6. For example, the height $h_0$ may be 0.5.

The nanostructures 410a may be disposed on the display panel 10 in an irregular form. A diffraction phenomenon caused by the anti-reflective layer 40 may be prevented or reduced by the irregularly disposed (e.g., irregularly arranged) nanostructures 410a. In the case of including a plurality of regularly arranged nanostructures, a diffraction pattern may be visible by light emitted from the display panel 10. However, according to the present exemplary embodiment, it is possible to prevent or reduce a phenomenon in which the diffraction pattern is visible by including the irregularly disposed nanostructures 410a.

The nano-pattern layer 410 may have a refractive index that is in a range of about 1.4 to 1.7, e.g., about 1.5 to 1.6, and may have a refractive index that is lower than that of a constituent element of the display panel 10 adjacent thereto.

The nano-pattern layer 410 may include a transparent polymer material. The nanopatterned layer 410 may include a material that is polymerized by a thermal or light curing process. For example, the nano-pattern layer 410 may include at least one of polymethyl methacrylate (PMMA), polycarbonate (PC), polyurethane (PU), acrylate monomers or oligomers having two or more functional groups and 9 or less functional groups, an organosilane containing an acrylate group or an epoxy group as a reactor (e.g., a reactive group), a phosphazene compound containing an acrylate group or a vinyl group as a reactor (e.g., a reactive group), and an adamantane compound containing an acrylate group or a vinyl group as a reactor (e.g., a reactive group).

The nano-pattern layer 410 may be manufactured by an electrospraying or electrospinning method according to an example. The nano-pattern layer 410 may include any suitable material capable of forming the nanostructures 410a by the electrospraying or electrospinning method.

The nanostructures 410a may have a nano-fiber form. The nanostructures 410a which have the nano-fiber form may be formed by the electrospinning method according to an exemplary embodiment.

In addition, the nanostructures 410a may have a nano-particle form. The nanostructures 410a which have the nano-particle form may be formed by the electrospraying method according to an exemplary embodiment.

The low-refraction layer 420 may be positioned on the nano-pattern layer 410 and the display panel 10. The low-refraction layer 420 may have such a shape so as to completely cover the nanostructures 410a and so as to overlap a plane of the display panel 10.

A refractive index of the low-refraction layer 420 which covers the nano-pattern layer 410 may be less than that of the nano-pattern layer 410, and may be in range of about 1.2 to 1.4.

The low-refraction layer 420 may include any suitable transparent material that satisfies the above-described refractive index. For example, the low-refraction layer 420 may include a polymeric material including a porous silica material dispersed in a polymer matrix, or a polymer material including a porous polymer or a polymer material in which at least one hydrogen contained in a hydrocarbon is substituted with fluorine, but the present disclosure is not limited thereto.

The anti-reflective layer 40 which includes the nano-pattern layer 410 and the low-refraction layer 420 may have a structure in which the refractive index thereof gradually changes.

As illustrated in FIG. 2, in the anti-reflective layer 40, a first region R1 adjacent to the display panel 10 has a large area occupied by the nanostructures 410a having a relatively high refractive index. Next, in a second region R2, an area occupied by the nanostructures 410a is slightly reduced as compared with the first region R1, and an area occupied by the low-refraction layer 420 is slightly increased. The second region R2 may have a lower refractive index as compared with the first region R1. Similarly, in the third region R3, an area occupied by the nanostructures 410a is slightly reduced as compared with the second region R2, and an area occupied by the low-refraction layer 420 is slightly increased. The third region R3 has a lower refractive index than the second region R2, and the fourth region R4 has a lower refractive index than the third region R3 by the same principle. Since the low-refraction layer 420 having a relatively low refractive index is positioned in the fifth region R5, it may have a lower refractive index than the fourth region R4 in which the nanostructures 410a having a relatively high refractive index are positioned.

According to this principle, the anti-reflective layer 40 may have a refractive index as shown in FIG. 3. The refractive index of the anti-reflective layer 40 may gradually decrease along a direction (third direction) from an area adjacent to the display panel 10 toward the outside of the display device 10.

Light emitted from the display panel 10 according to the present exemplary embodiment has a Lambertian emission pattern. The light emitted from the display panel 10 may be emitted in various directions.

The emitted light may not be emitted to the outside of the display panel 10 due to a refractive index difference between the display panel 10 and the air, and may be totally reflected to the inside of the display panel 10. Light-emitting efficiency of the display panel 10 is thereby reduced.

However, the display device according to the present exemplary embodiment includes an anti-reflection layer 40 positioned outside the display panel 10. The anti-reflective layer 40 may have a structure in which the refractive index gradually decreases along the direction toward the outside of the display device in the display panel 10. Accordingly, total reflection occurring at an interface between the display panel 10 and the air may be reduced, and light output efficiency of the display device may be increased.

Figure 4:
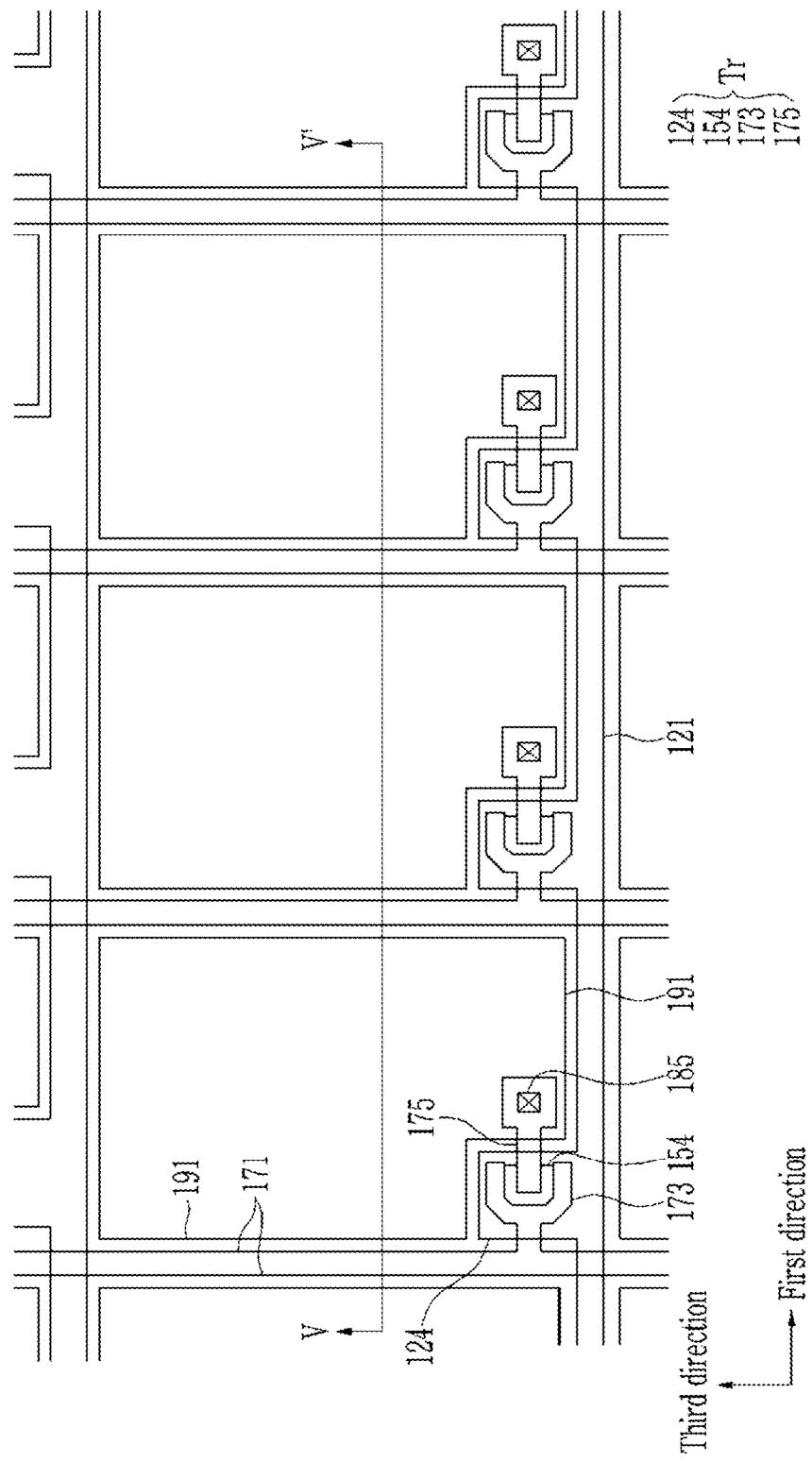
FIG. 4 is a top plan view illustrating a plurality of pixels included in a display device according to an exemplary embodiment.
Figure 5:
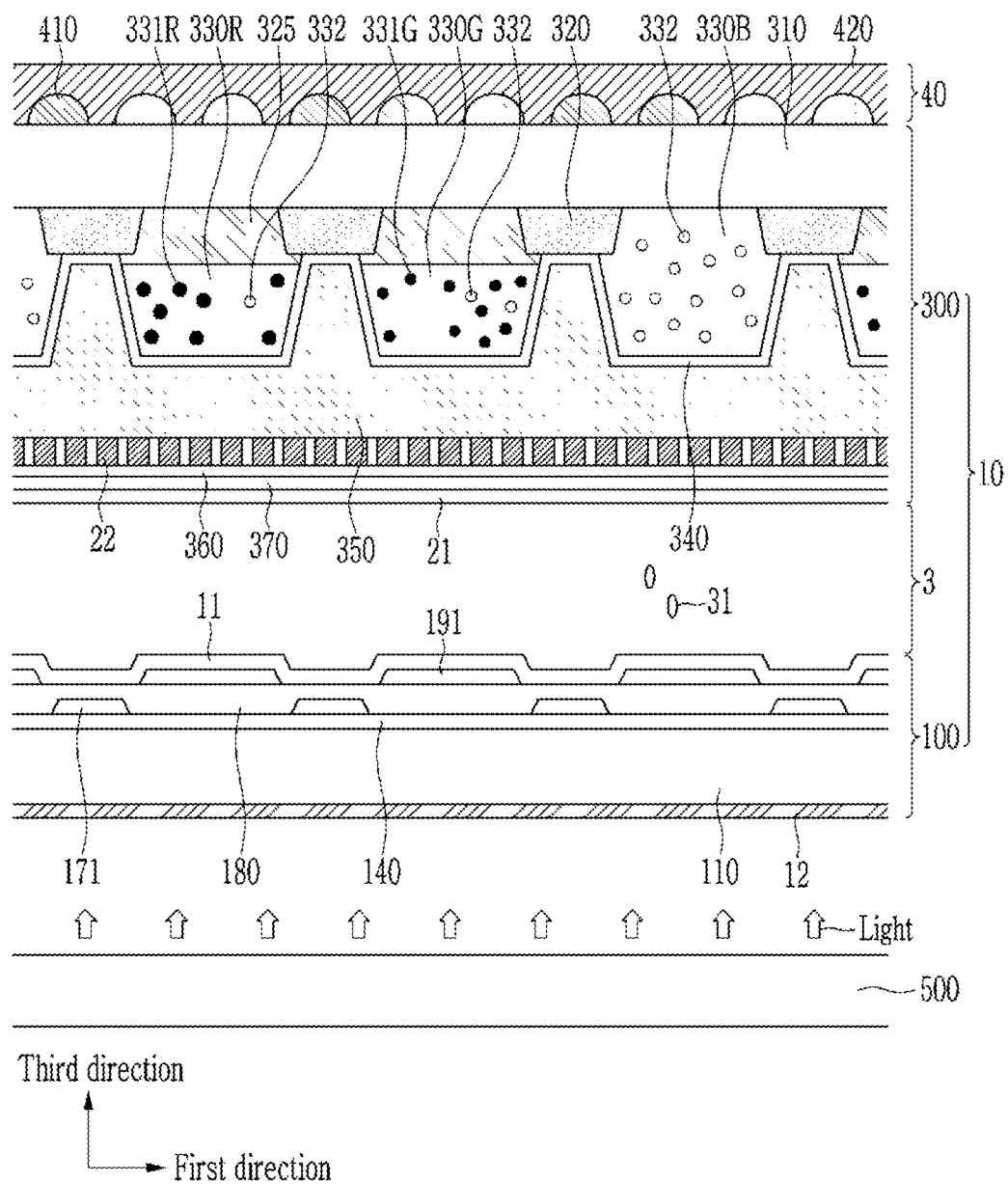
FIG. 5 is a cross-sectional view taken along a line V-V' of FIG. 4.
Figure 6:
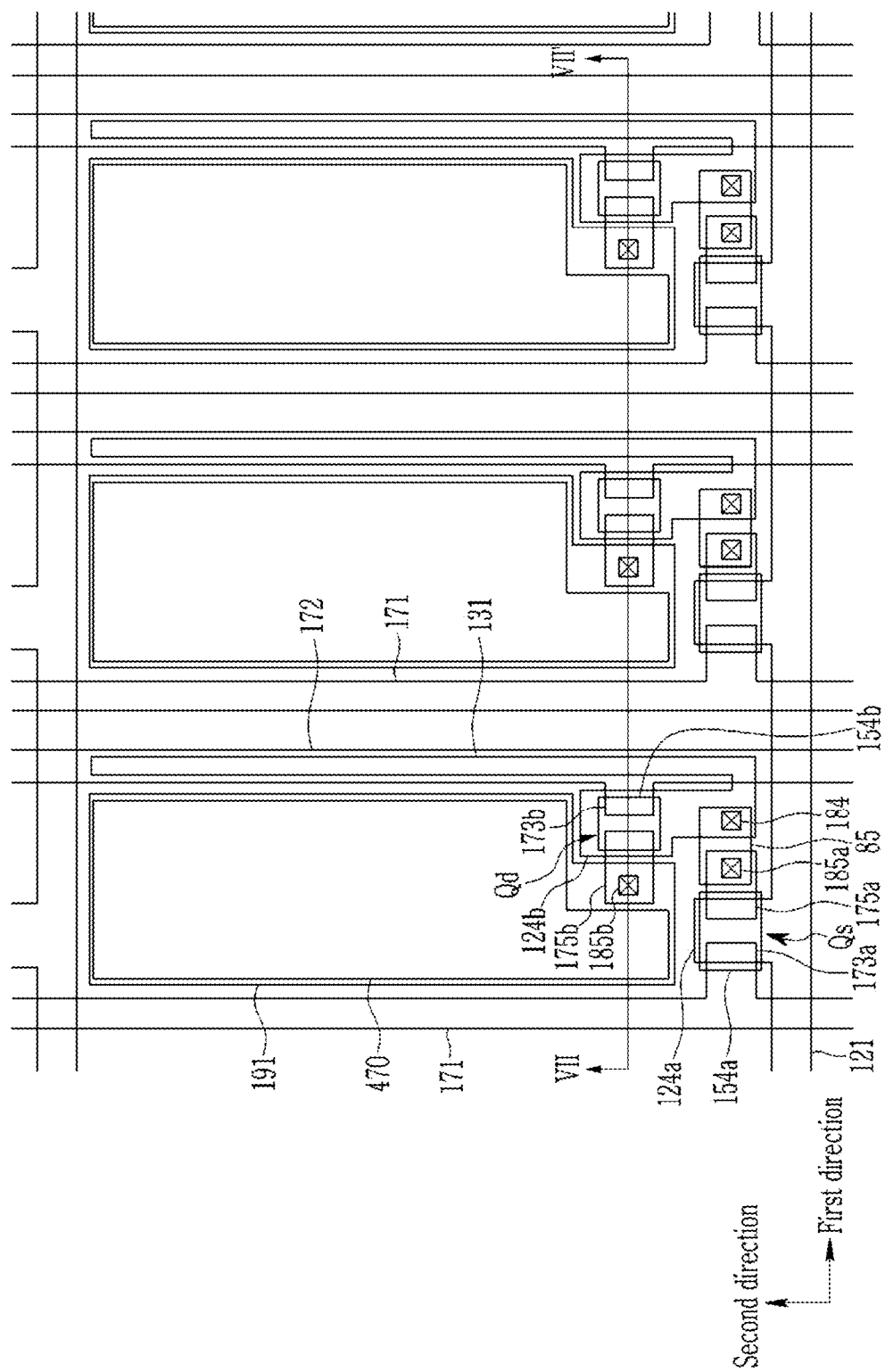
FIG. 6 is a top plan view illustrating a plurality of pixels included in a display device according to an exemplary embodiment.
Figure 7:
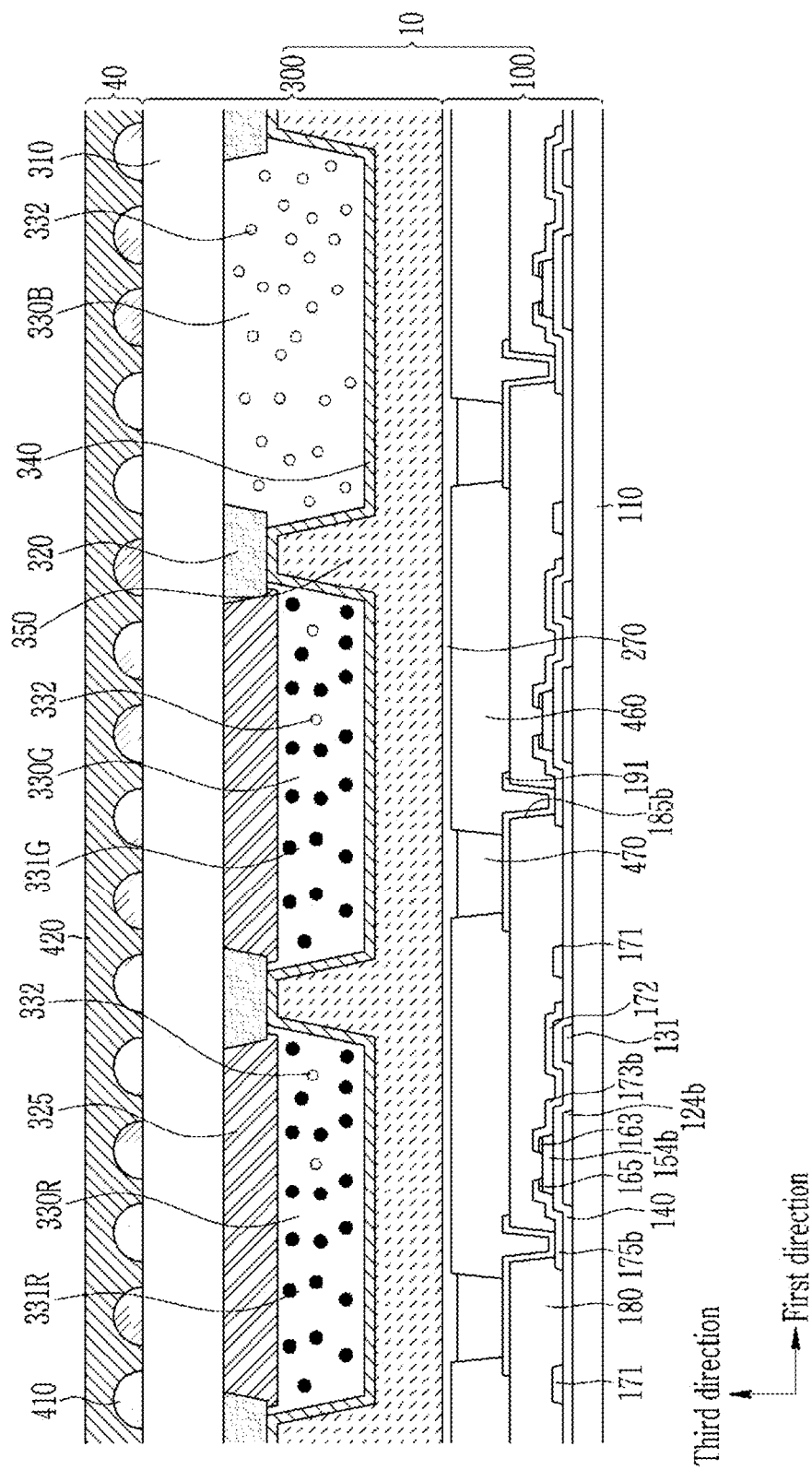
FIG. 7 is a cross-sectional view taken along a line VII-VII' of FIG. 6.

Hereinafter, a display device according to an exemplary embodiment will be described with reference to FIG. 4 to FIG. 7. FIG. 4 is a top plan view illustrating a plurality of pixels included in a display device according to an exemplary embodiment, FIG. 5 is a cross-sectional view taken along a line V-V' of FIG. 4, FIG. 6 is a top plan view illustrating a plurality of pixels included in a display device according to an exemplary embodiment, and FIG. 7 is a cross-sectional view taken along a line VII-VII' of FIG. 6.

The display device according to the present exemplary embodiment includes a light unit 500, a display panel 10, and an anti-reflective layer 40 which overlaps the display panel 10. The display panel 10 includes a thin film transistor array panel 100, a color conversion display panel 300 which separately overlaps the thin film transistor array panel 100, and a liquid crystal layer 3 positioned between the thin film transistor array panel 100 and the color conversion display panel 300.

In the present exemplary embodiment, the anti-reflective layer 40 is the same as the anti-reflective layer 40 described above with reference to FIG. 1 to FIG. 3, and thus a repeated description thereof will not be provided below.

The light unit 500 is positioned in the third direction on a rear surface of the thin film transistor array panel 100. The light unit 500 may include a light source for generating light, and a light guide plate for receiving the light and guiding the received light toward the thin film transistor display panel 100.

The light unit 500 may include any suitable light source that emits blue light, and may include, e.g., a light emitting diode. A light unit 500 including a white light source or an ultraviolet light source may be used instead of the light unit 500 including a blue light source. Hereinafter, a display device using the light unit 500 including the blue light source will be described.

The light source may be an edge type (or kind) disposed on at least one side surface of the light guide plate or a direct lower type (or kind) positioned directly below the light guide plate, but the present disclosure is not limited thereto.

The thin film transistor array panel 100 includes a first polarization layer 12 positioned between a first substrate 110 and the light unit 500. The first polarization layer 12 serves to polarize light introduced from the light unit 500 to the first substrate 110.

The first polarization layer 12 may include at least one of an applied polarization layer, a coated polarization layer, and a wire grid polarizer, but it is not limited thereto. The first polarization layer 12 may be disposed on one side of the first substrate 110 in various suitable forms such as a film form, a coating form, an attachment form, a printing form, and the like, but it is not limited thereto.

The thin film transistor array panel 100 may include a gate line 121 extending in a first direction between the first substrate 110 and the liquid crystal layer 3 and including a gate electrode 124, a gate insulating layer 140 positioned between the gate line 121 and the liquid crystal layer 3, a semiconductor layer 154 positioned between the gate insulating layer 140 and the liquid crystal layer 3, a data line 171 positioned between the semiconductor layer 154 and the liquid crystal layer 3 and extending in a second direction, a source electrode 173 coupled to (e.g., connected to) the data line 171, a drain electrode 175 separated from the source electrode 173, and a passivation layer 180 positioned between the data line 171 and the liquid crystal layer 3.

The semiconductor layer 154 constitutes a channel in a part that is not covered by the source electrode 173 and the drain electrode 175. The gate electrode 124, the semiconductor layer 154, the source electrode 173, and the drain electrode 175 constitute one thin film transistor Tr.

A pixel electrode 191 is positioned on the passivation layer 180. The pixel electrode 191 may be physically and electrically coupled to (e.g., electrically connected to) the drain electrode 175 through a contact hole 185 included in the passivation layer 180.

A first alignment layer 11 may be disposed between the pixel electrode 191 and the liquid crystal layer 3.

The color conversion display panel 300 includes a substrate 310 which overlaps the thin film transistor array panel 100. A light blocking member 320 is positioned between the substrate 310 and the thin film transistor array panel 100. For example, the light blocking member 320 is positioned between the substrate 310 and red and green color conversion layers 330R and 330G described in more detail herein below, and between the substrate 310 and a transmissive layer 330B described in more detail herein below.

The light blocking member 320 may be positioned between the red color conversion layer 330R and the green color conversion layer 330G, between the green color conversion layer 330G and the transmissive layer 330B, and between the transmissive layer 330B and the red color conversion layer 330R along the first direction. In addition, the light blocking member 320 may be positioned between red color conversion layers 330R that are adjacent to each other, green color conversion layers 330G that are adjacent to each other, and transmissive layers 330B that are adjacent to each other. The light blocking member 320 may have a lattice shape or a straight-line shape in a plan view.

The light blocking member 320 may prevent or reduce mixture of different light emitted from adjacent pixels, and may partition regions in which the red color conversion layer 330R, the green color conversion layer 330G, and the transmissive layer 330B are disposed. The light blocking member 320 may be made of any suitable material capable of blocking (reflecting or absorbing) light (e.g., to reduce light transmittance).

A blue light cutting filter 325 may be positioned between the substrate 310 and the light blocking member 320, and the thin film transistor array panel 100. The blue light cutting filter 325 may be positioned between the red color conversion layer 330R and the substrate 310 and between the green color conversion layer 330G and the substrate 310. The blue light cutting filter 325 may overlap regions emitting red and green light, and may not overlap a region emitting blue light.

The blue light cutting filter 325 includes a first region overlapping the red color conversion layer 330R and a second region overlapping the green color conversion layer 330G, and these regions may be separated from each other. However, the present disclosure is not limited thereto, and the first region and the second region may be formed to be coupled to (e.g., connected to) each other.

The blue light cutting filter 325 may block the blue light supplied from the light unit 500. The blue light incident from the light unit 500 to the red color conversion layer 330R and the green color conversion layer 330G is converted into red or green light by semiconductor nanocrystals 331R and 331G, and some blue light may not be converted but is emitted. The blue light emitted without conversion is mixed with the red light or the green light, thus color reproducibility may deteriorate. However, the blue light cutting filter 325 may block (absorb or reflect) the blue light supplied from the light unit 500 from being emitted through the substrate 310 without absorption in the red color conversion layer 330R and the green color conversion layer 330G.

The blue light cutting filter 325 may include any suitable material capable of obtaining the above-described effects, and as one example, may include a yellow color filter. The blue light cutting filter 325 may have a stacked structure of a single layer or multiple layers.

In the present specification, the blue light cutting filter 325 contacting the substrate 310 is shown, but the present disclosure is not limited thereto, and a separate buffer layer may be positioned between the substrate 310 and the blue light cutting filter 325.

The plurality of the color conversion layers 330R and 330G and the transmissive layer 330B may be positioned between the substrate 310 and the thin film transistor array panel 100. The color conversion layers 330R and 330G and the transmissive layer 330B may be arranged along the first direction.

The plurality of the color conversion layers 330R and 330G may convert incident light into light having a different wavelength from that of the incident light, and emit the converted light. The plurality of the color conversion layers 330R and 330G may include the red color conversion layer 330R and the green color conversion layer 330G.

The incident light is not converted in the transmissive layer 330B, and the incident light may be emitted as it is. As an example, blue light may be incident on the transmissive layer 330B, and may be emitted as it is.

The red color conversion layer 330R may include the first semiconductor nanocrystal 331R that converts incident blue light into red light. The first semiconductor nanocrystal 331R may include at least one of a phosphor and a quantum dot.

The green color conversion layer 330G may include the second semiconductor nanocrystal 331G that coverts incident blue light into green light. The second semiconductor nanocrystal 331G may include at least one of a phosphor and a quantum dot.

The quantum dots included in the first semiconductor nanocrystal 331R and the second semiconductor nanocrystal 331G may be independently selected from a Group II-VI compound, a Group III-V compound, a Group IV-VI compound, a Group IV element, a Group IV compound, and a combination thereof.

For the group II-VI compound, a binary compound selected from CdSe, CdTe, ZnS, ZnSe, ZnTe, ZnO, HgS, HgSe, HgTe, MgSe, MgS, and a mixture thereof; a ternary compound selected from CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and a mixture thereof; or a quaternary compound selected from HgZnTeS, CdZnSeS, CdZnSeTe, CdZnSTe, CdHgSeS, CdHgSeTe, CdHgSTe, HgZnSeS, HgZnSeTe, HgZnSTe, and a mixture thereof, may be employed. For the group III-V compound, a binary compound selected from GaN, GaP, GaAs, GaSb, AlN, AlP, AlAs, AlSb, InN, InP, InAs, InSb, and a mixture thereof; a ternary compound selected from GaNP, GaNAs, GaNSb, GaPAs, GaPSb, AlNP, AlNAs, AlNSb, AlPAs, AlPSb, InNP, InNAs, InNSb, InPAs, InPSb, and a mixture thereof; or a quaternary compound selected from GaAlNAs, GaAlNSb, GaAlPAs, GaAlPSb, GaInNP, GaInNAs, GaInNSb, GaInPAs, GaInPSb, GaAlNP, InAlNP, InAlNAs, InAlNSb, InAlPAs, InAlPSb, and a mixture thereof, may be employed. For the group IV-VI compound, a binary compound selected from SnS, SnSe, SnTe, PbS, PbSe, PbTe, and a mixture thereof; a ternary compound selected from SnSeS, SnSeTe, SnSTe, PbSeS, PbSeTe, PbSTe, SnPbS, SnPbSe, SnPbTe, and a mixture thereof; or a quaternary compound selected from SnPbSSe, SnPbSeTe, SnPbSTe, and a mixture thereof, may be employed. For the IV group element, Si, Ge, or a mixture thereof may be selected. For the IV group compound, a binary compound selected from SiC, SiGe, and a mixture thereof may be employed.

In this case, the binary compound, the ternary compound, or the quaternary compound may exist in a uniform (or substantially uniform) concentration or in a partially different concentration in particles. The quantum dot may include multiple quantum dots, and the quantum dots may have a core/shell structure in which one quantum dot surrounds another quantum dot. An interface between a core and a shell may have a concentration gradient such that a concentration of an element in the shell decreases toward a center thereof.

The quantum dot may have a full width at half maximum (FWHM) of the light-emitting wavelength spectrum that is equal to or less than about 45 nm, equal to or less than about 40 nm, or, for example, equal to or less than about 30 nm, and in this range, color purity or color reproducibility may be improved. In addition, light emitted through the quantum dot may be emitted in all directions to have a Lambertian emission pattern, thereby improving a viewing angle of light.

When the first semiconductor nanocrystal 331R includes a red phosphor, the red phosphor may include at least one selected from a group including (Ca, Sr, Ba)S, (Ca, Sr, Ba)$_2$Si$_5$N$_8$, CaAlSiN$_3$, CaMoO$_4$, and Eu$_2$Si$_5$N$_8$, and but the present disclosure is not limited thereto When the second semiconductor nanocrystal 331G includes a green phosphor, the green phosphor may include at least one selected from a group including yttrium aluminum garnet (YAG), (Ca, Sr, Ba)$_2$SiO$_4$, SrGa$_2$S$_4$, BAM, α-SiAlON, β-SiAlON, Ca3Sc2Si3O12, Tb3Al5O12, BaSiO4, CaAlSiON and (Sr1-xBax)Si2O2N2, but the present disclosure is not limited thereto. The x may be any number between 0 and 1.

The transmissive layer 330B may pass incident light as it is. The transmissive layer 330B may include a resin passing blue light. The transmissive layer 330B positioned at the region emitting the blue light does not include the separate semiconductor nanocrystal, and passes the incident blue as it is.

The transmissive layer 330B may further include at least one of a dye and a pigment. The transmissive layer 330B including the dye or pigment may reduce the external light reflection, and may provide the blue light with improved color purity.

At least one of the red color conversion layer 330R, the green color conversion layer 330G, and the transmissive layer 330B may further include scatterers 332. Contents of respective scatterers 332 included in the red color conversion layer 330R, the green color conversion layer 330G, and the transmissive layer 330B may be different.

The scatterers 332 may increase an amount of light that is converted in or passes through the color conversion layers 330R and 330G and the transmissive layer 330B and then is emitted, and may uniformly (or substantially uniformly) provide front luminance and lateral luminance.

The scatterer 332 may include any suitable material capable of evenly (or substantially evenly) scattering incident light. As an example, the scatterer 332 may include at least one among TiO$_2$, ZrO$_2$, Al$_2$O$_3$, In$_2$O$_3$, ZnO, SnO$_2$, Sb$_2$O$_3$, and ITO.

An optical filter layer 340 is positioned between the color conversion layers 330R and 330G and an over-coating layer 350, and between the transmissive layer 330B and the over-coating layer 350.

The optical filter layer 340 may serve as a filter that reflects or absorbs light other than light having a set or specific wavelength while transmitting the light having the set or specific wavelength. The light filter layer 340 may have a structure in which layers having a high refractive index and layers having a low refractive index are alternately stacked, and may utilize reinforcement and/or offsetting interference between these layers to transmit and/or reflect the set or predetermined wavelength as above-described.

The light filter layer 340 may include at least one of TiO$_2$, SiN$_x$, SiO$_y$, TiN, AlN, Al$_2$O$_3$, SnO$_2$, WO$_3$, and ZrO$_2$, and as one example, it may have a structure in which SiNx and SiOy are alternately stacked. The x and y may be adjusted according to process conditions for forming the layers as factors for determining a chemical composition ratio in SiNx and SiOy.

In another exemplary embodiment, the light filter layer 340 may be omitted, and it may be replaced with a low refractive layer or the like.

The over-coating layer 350 is positioned between the light filter layer 340 and the thin film transistor array panel 100. The over-coating layer 350 may overlap a front surface of the substrate 310.

The over-coating layer 350 may flatten a surface of one of the red color conversion layer 330R, the green color conversion layer 330G, and the transmissive layer 330B. The over-coating layer 350 includes an organic material, but is not limited thereto, and may include any suitable material having the flattening function.

A second polarization layer 22 may be positioned between the over-coating layer 350 and the liquid crystal layer 3. The second polarization layer 22 may be at least one of a deposited polarization layer, a coated polarization layer, and a wire grid polarization layer, but is not limited thereto, and the second polarization layer 22 may be a wire grid polarization layer including a metal pattern as one example. The second polarization layer 22 may be formed between the over-coating layer 350 and the liquid crystal layer 3 by various suitable methods such as the film type (or kind), the coating type (or kind), the printing type (or kind), and the like. When the second polarization layer 22 is the wire grid polarization layer, the second polarization layer 22 may include a plurality of bars having a width of several nanometers.

An insulating layer 360, a common electrode 370, and a second alignment layer 21 are positioned between the second polarization layer 22 and the liquid crystal layer 3.

The insulating layer 360 serves to insulate the second polarization layer 22 and the common electrode 370 of the metal material. The insulating 360 may be omitted when the second polarization layer 22 is not the metal material. The common electrode 370 receiving the common voltage may generate an electric field with the above-described pixel electrode 191. The configuration in which the common electrode 370 is positioned in a different display panel from that of the pixel electrode 191 is described in the present specification, but is not limited thereto, and they may be included in the same display panel.

The liquid crystal layer 3 is positioned between the thin film transistor array panel 100 and the color conversion display panel 300, and includes a plurality of liquid crystal molecules 31. It is possible to control transmittance of the light received from the light unit 500 according to a degree of movement of the liquid crystal molecules 31 and the like.

Hereinafter, a display device according to another exemplary embodiment will be described with reference to FIG. 6 and FIG. 7.

The display device according to the present exemplary embodiment includes a display panel 10 and an anti-reflective layer 40 positioned on the display panel 10. The anti-reflective layer 40 is the same as the anti-reflective layer 40 described above with reference to FIG. 1 to FIG. 3, and thus, a repeated description thereof will not be provided below.

The display panel 10 includes a thin film transistor array panel 100, and a color conversion display panel 300 positioned on the thin film transistor array panel 100. The color conversion display panel 300 is the same as the color conversion display panel 300 described above with reference to FIG. 4 and FIG. 5, and thus a redundant description thereof will not be repeated below.

In the present exemplary embodiment, the thin film transistor array panel 100 includes a gate conductor including the gate line 121 positioned on the first substrate 110 and including a first gate electrode 124a, a second gate electrode 124b, and an extension 131 extending from the second gate electrode 124b.

The gate insulating layer 140 including a silicon nitride (SiNy) or a silicon oxide (SiOx) is positioned on the gate conductor (121, 124a, 124b, and 131).

A first semiconductor layer 154a and a second semiconductor layer 154b including amorphous silicon, polysilicon, or an oxide semiconductor are positioned on the gate insulating layer 140. The first semiconductor layer 154a and the second semiconductor layer 154b overlap the first gate electrode 124a and the second gate electrode 124b, respectively.

Ohmic contacts 163 and 165 are positioned on the first semiconductor layer 154a and the second semiconductor layer 154b. According to another exemplary embodiment, the ohmic contacts may be omitted.

A data conductor including a data line 171 including a first source electrode 173a, a driving voltage line 172 including a second source electrode 173b, a first drain electrode 175a, and a second drain electrode 175b is positioned on the ohmic contacts 163 and 165 and the gate insulating layer 140.

The first source electrode 173a and the first drain electrode 175a face each other based on the first gate electrode 124a, and the second source electrode 173b and the second drain electrode 175b face each other based on the second gate electrode 124b.

A passivation layer 180 is positioned on the data conductors 171, 172, 173a, 173b, 175a, and 175b and the exposed semiconductor layers 154a and 154b.

The passivation layer 180 has contact holes 185a and 185b respectively overlapping the first drain electrode 175a and the second drain electrode 175b, and the passivation layer 180 and the gate insulating layer 140 have a contact hole 184 overlapping the second gate electrode 124b.

A pixel electrode 191 and a connecting member 85 are positioned on the passivation layer 180. The pixel electrode 191 is physically and electrically coupled to (e.g., electrically connected to) the second drain electrode 175b through the contact hole 185b, and the connecting member 85 couples (e.g., connects) the second gate electrode 124b and the first drain electrode 175a through the contact holes 184 and 185a.

A partition wall 460 is positioned on the passivation layer 180. The partition wall 460 encloses an edge of the pixel electrode 191 like a bank, and is made of an organic insulator or an inorganic insulator.

An emission layer 470 is positioned on the pixel electrode 191. The emission layer 470 of an emissive display device according to the present exemplary embodiment may emit the blue light.

In a case of a general emissive display device, the emission layer 470 includes a material uniquely emitting any one among primary colors such as three primary colors of red, green, and blue, but in the emissive display device according to the present exemplary embodiment, the color conversion display panel 300 is positioned at the upper surface of the emissive display device to display each color of red, green, and blue, thereby including only the material emitting the blue light.

The present specification shows the emission layer 470 positioned to be separated for each pixel, however it is not limited thereto, and the emission layer 470 positioned at adjacent pixels may be coupled to (e.g., connected to) each other. The emission layer positioned at the region emitting the red light, the emission layer positioned at the region emitting the green light, and the emission layer positioned at the region emitting the blue light may be coupled to (e.g., connected to) each other.

A common electrode 270 is positioned on the emission layer 470.

In this emissive display device, the first gate electrode 124a coupled to (e.g., connected to) the gate line 121, the first source electrode 173a coupled to (e.g., connected to) the data line 171, and the first drain electrode 175a form the switching transistor Qs along with the first semiconductor layer 154a, and the channel of the switching transistor Qs is formed in the first semiconductor layer 154a between the first source electrode 173a and the first drain electrode 175a. The second gate electrode 124b coupled to (e.g., connected to) the first drain electrode 175a, the second source electrode 173b coupled to (e.g., connected to) the driving voltage line 172, and the second drain electrode 175b coupled to (e.g., connected to) the pixel electrode 191 form the driving transistor Qd along with the second semiconductor layer 154b, and the channel of the driving transistor Qd is formed in the second semiconductor layer 154b between the second source electrode 173b and the second drain electrode 175b. The pixel electrode 191, the emission layer 470, and the common electrode 270 form the organic light emitting diode (OLED), and the pixel electrode 191 becomes an anode while the common electrode 270 becomes a cathode, however the pixel electrode 191 may become the cathode and the common electrode 270 may become the anode.

This emissive display device may emit the light upward and downward with respect to the first substrate 110 to display the image, and the exemplary embodiment in which the light is emitted upward with respect to the first substrate 110 is described according to an exemplary embodiment of the present disclosure.

Figure 8:
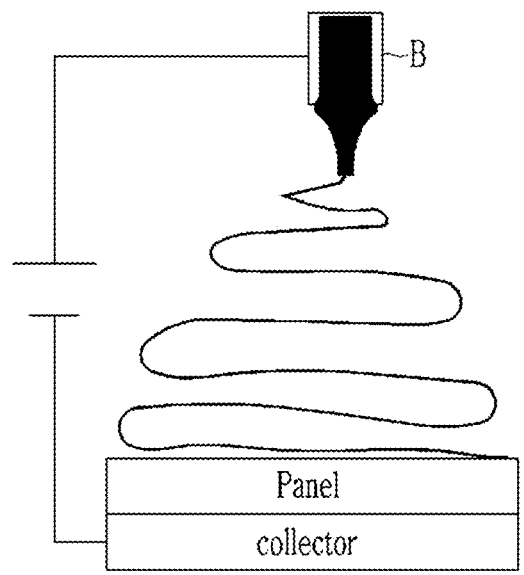
FIG. 8 is a schematic diagram illustrating an electrospinning method according to an exemplary embodiment.
Figure 9:
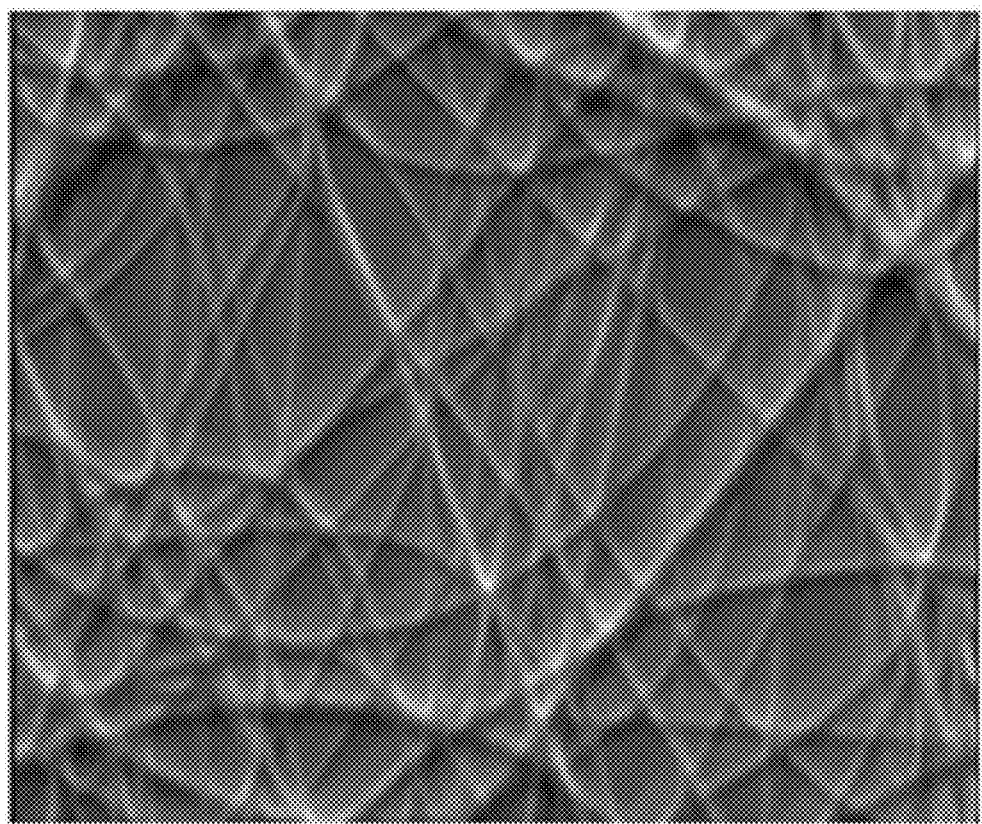
FIG. 9 is an enlarged image of a nano-pattern layer manufactured according to the electrospinning method.
Figure 10:
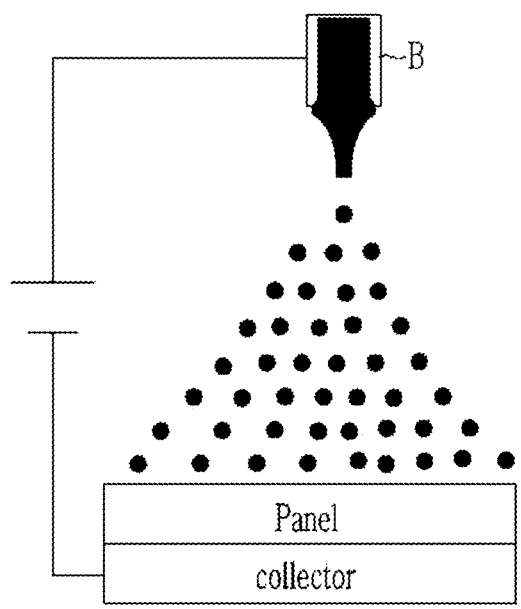
FIG. 10 is a schematic diagram illustrating an electrospraying method according to an exemplary embodiment.
Figure 11:
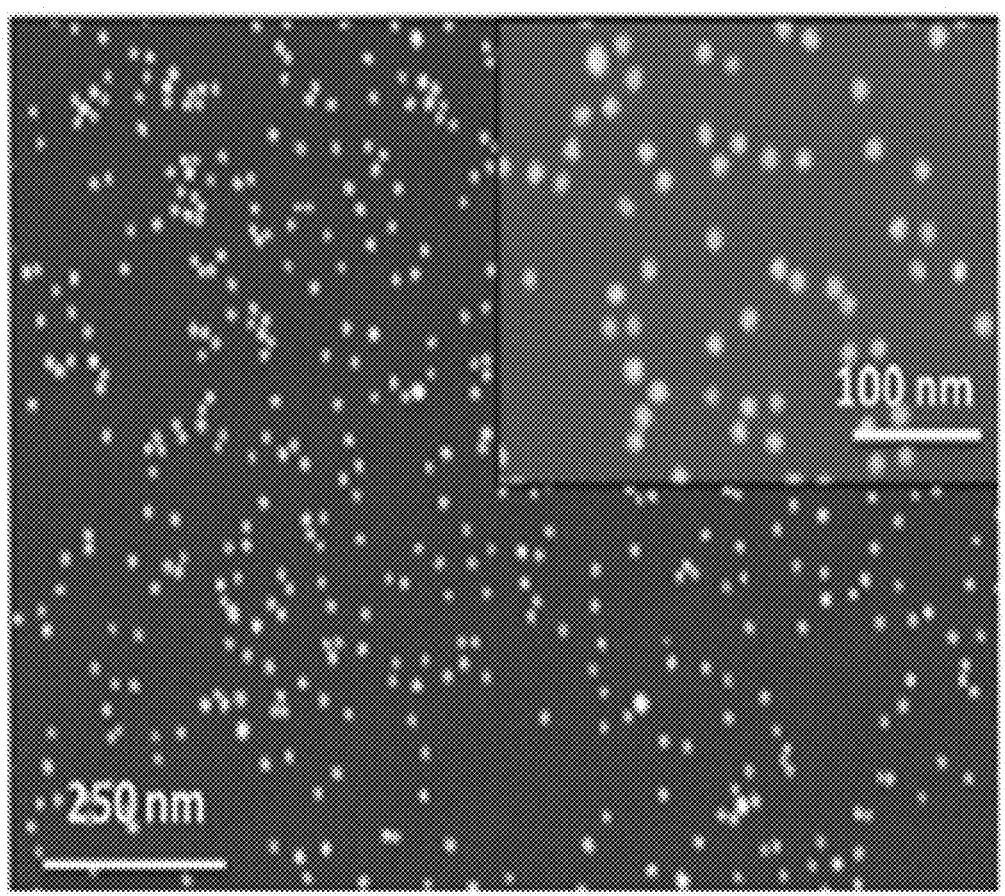
FIG. 11 is an enlarged image of a nano-pattern layer manufactured according to the electrospraying method.

Hereinafter, a schematic manufacturing method of a nano-pattern layer will be described with reference to FIG. 8 to FIG. 11. FIG. 8 is a schematic diagram illustrating an electrospinning method according to an exemplary embodiment, and FIG. 9 is an enlarged image of a nano-pattern layer manufactured according to the electrospinning method. FIG. 10 is a schematic diagram illustrating an electrospraying method according to an exemplary embodiment, and FIG. 11 is an enlarged image of a nano-pattern layer manufactured according to the electrospraying method.

Referring to FIG. 8, a display panel (Panel) is positioned on a substrate (Collector). Thereafter, a voltage is applied to an injection nozzle B and a substrate (Collector) to provide a nanostructure of a nano-fiber type (or kind). In this case, the voltage applied onto the injection nozzle B and the substrate (Collector) may be in a range of about 1 kV to 40 kV.

A nanostructure manufactured by the electrospinning method may be seen as an image illustrated in FIG. 9.

Referring to FIG. 10, a display panel (Panel) is positioned on a substrate (Collector). Thereafter, a voltage is applied to an injection nozzle B and a substrate (Collector) to provide a nanostructure of a nano-particle type (or kind).

The voltage applied to the injection nozzle B and the substrate (Collector) may be in a range of about 1 kV to 40 kV.

A nanostructure manufactured by the electrospraying method may be seen as an image illustrated in FIG. 11.

The nanostructure manufactured in this manner may be cured through a heat curing process or a light curing process. Next, a low-refraction layer may be formed by applying a low-refraction material to cover the nanostructure. However, the anti-reflective layer according to the present exemplary embodiment may be manufactured by any suitable method, and is not limited to the above-mentioned method.

Figure 12:
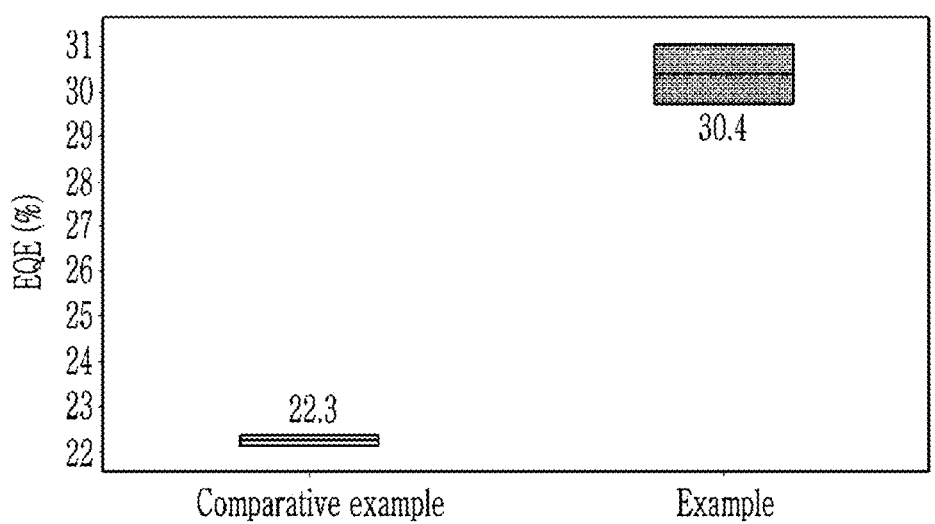
FIG. 12 is a graph showing external quantum efficiency (EQE) according to an example and a comparative example.

Hereinafter, an example and a comparative example will be described with reference to FIG. 12 to FIG. 14. FIG. 12 is a graph showing external quantum efficiency (EQE) according to an example and a comparative example, FIG. 13 is an image of a display device according to the comparative example, and FIG. 14 is an image of a display device according to the example.

Referring to FIG. 12, external quantum efficiency EQE was about 30.4% in an example including an anti-reflective layer positioned on the display panel. In contrast, the external quantum efficiency was about 22.3% in a comparative example including a display panel without an anti-reflective layer. According to an example, in the case of including the anti-reflective layer, it is seen that the external quantum efficiency is increased by about 8% as compared with the comparative example.

Figure 13:
FIG. 13 is an image of a display device according to the comparative example.
Figure 14:
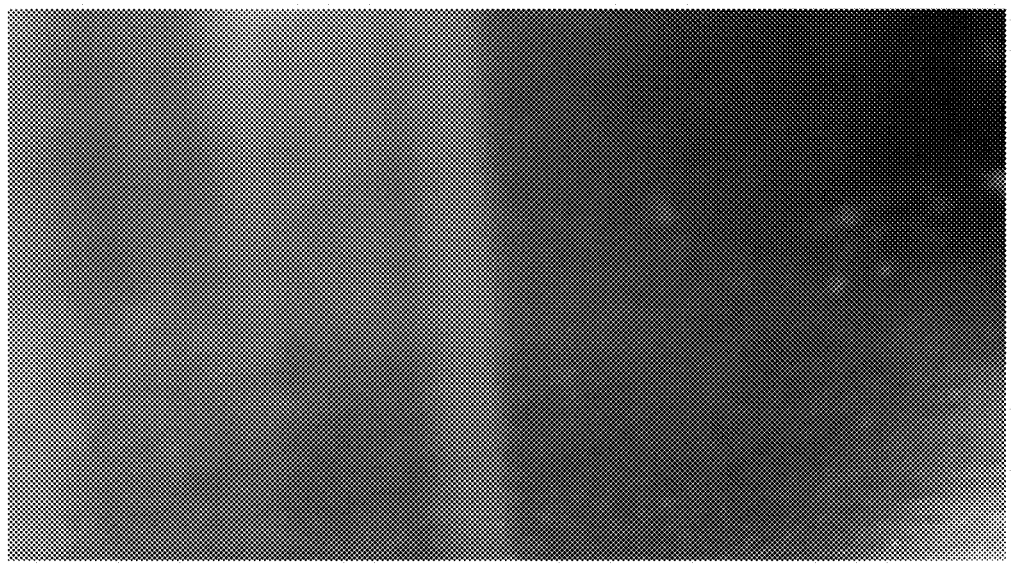
FIG. 14 is an image of a display device according to the example.

FIG. 13 illustrates a surface image of the display device including no anti-reflective layer according to the comparative example, and FIG. 14 illustrates a surface image of the display device including the anti-reflective layer according to the example. Comparing FIG. 13 and FIG. 14, it can be seen that a blur phenomenon is significant in the display device according to the comparative example. According to the present exemplary embodiment, the display device may provide a surface without blurring.

According to the above-described embodiment, an efficiency of outputting light to the outside can be increased, and the blur phenomenon and the diffraction phenomenon can be reduced, and thus a display device with improved display quality may be provided.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

As used herein, the terms "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

Also, any numerical range recited herein is intended to include all subranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

While the subject matter of the present disclosure has been described in connection with what is presently considered to be practical exemplary embodiments, it is to be understood that the present disclosure is not limited to the disclosed embodiments, but, on the contrary, is intended to cover various modifications and equivalent arrangements included within the spirit and scope of the appended claims.

DESCRIPTION OF SOME OF THE SYMBOLS

10: display panel
40: anti-reflective layer
410: nano-pattern layer
410*a*: nanostructure
420: low-refraction layer

What is claimed is:

1. A display device comprising:
a display panel; and
an anti-reflective layer overlapping the display panel,
wherein the anti-reflective layer comprises:
a nano-pattern layer comprising a plurality of nanostructures; and
a low-refraction layer covering the nanostructures,
wherein the nanostructures are irregularly arranged,
wherein the display panel comprises:
a color conversion layer comprising a semiconductor nanocrystal; and a transmissive layer, and
wherein the anti-reflective layer overlaps the color conversion layer and the transmissive layer.

2. The display device of claim 1, wherein a diameter of each of the nanostructures is in a range of about 300 nm to about 800 nm.

3. The display device of claim 1, wherein a ratio of a height of the nanostructures relative to each diameter thereof is in a range of about 0.4 to about 0.6.

4. The display device of claim 1, wherein a refractive index of the nano-pattern layer is in a range of about 1.4 to about 1.7, and a refractive index of the low-refraction layer is in a range of about 1.2 to about 1.4.

5. The display device of claim 4, wherein a refractive index of the anti-reflective layer gradually increases along a direction toward the display panel.

6. The display device of claim 4, wherein the low-refraction layer comprises at least one of a porous material and a polymer material comprising a fluorine-substituted hydrocarbon.

7. The display device of claim 4, wherein the nano-pattern layer comprises at least one selected from polymethyl methacrylate (PMMA), polycarbonate (PC), polyurethane (PU), acrylate monomers or oligomers having two or more functional groups and nine or less functional groups, an organosilane containing an acrylate group or an epoxy group as a reactive group, a phosphazene compound containing an acrylate group or a vinyl group as a reactive group, and an adamantane compound containing an acrylate group or a vinyl group as a reactive group.

8. The display device of claim 1, wherein each of the nanostructures is at least one selected from a nano-fiber type and a nano-particle type.

9. The display device of claim 1, wherein light emitted from the display panel has a Lambertian emission pattern.

10. A display device comprising:
a display panel; and
an anti-reflective layer overlapping the display panel, wherein the anti-reflective layer comprises:
a nano-pattern layer positioned on the display panel and comprising a plurality of nanostructures; and
a low-refraction layer covering the nanostructures, wherein a refractive index of the nano-pattern layer is greater than a refractive index of the low-refraction layer, and a refractive index of the anti-reflective layer increases along a direction toward the display panel, wherein the display panel comprises:
a color conversion layer comprising a semiconductor nanocrystal; and
a transmissive layer, and
wherein the anti-reflective layer overlaps the color conversion layer and the transmissive layer.

11. The display device of claim 10, wherein a diameter of each of the nanostructures is in a range of about 300 nm to about 800 nm.

12. The display device of claim 10, wherein a ratio of a height of the nanostructures relative to each diameter thereof is in a range of about 0.4 to about 0.6.

13. The display device of claim 10, wherein the refractive index of the nano-pattern layer is in a range of about 1.4 to about 1.7, and the refractive index of the low-refraction layer is in a range of about 1.2 to about 1.4.

14. The display device of claim 13, wherein the low-refraction layer comprises a porous material or a polymer material comprising a fluorine-substituted hydrocarbon.

15. The display device of claim 13, wherein the nano-pattern layer comprises at least one selected from polymethyl methacrylate (PMMA), polycarbonate (PC), polyurethane (PU), acrylate monomers or oligomers having two or more functional groups and nine or less functional groups, an organosilane containing an acrylate group or an epoxy group as a reactive group, a phosphazene compound containing an acrylate group or a vinyl group as a reactive group, and an adamantane compound containing an acrylate group or a vinyl group as a reactive group.

16. The display device of claim 10, wherein the nanostructures are irregularly arranged.

17. The display device of claim 10, wherein each of the nanostructures is at least one selected from a nano-fiber type and a nano-particle type.

18. The display device of claim 10, wherein light emitted from the display panel has a Lambertian emission pattern.

* * * * *